US012006905B2

(12) United States Patent
Carugati et al.

(10) Patent No.: US 12,006,905 B2
(45) Date of Patent: Jun. 11, 2024

(54) METHOD AND DEVICE FOR DETECTING THE BREAKDOWN VOLTAGE BETWEEN THE ELECTRODES OF A SPARK PLUG CONNECTED TO AN IGNITION COIL FOR A CYLINDER IGNITION SYSTEM IN AN INTERNAL COMBUSTION ENGINE

(71) Applicant: ELDOR CORPORATION S.P.A., Orsenigo (IT)

(72) Inventors: Eugenio Carugati, Rovellasca (IT); Stefano Silva, Cantù (IT); Marco Albi, Grosotto (IT); Pasquale Forte, Castiglione d'Orcia (IT); Pierluigi Pozzi, Giussano (IT)

(73) Assignee: ELDOR CORPORATION S.P.A., Orsenigo (IT)

( * ) Notice: Subject to any disclaimer, the term of this patent is extended or adjusted under 35 U.S.C. 154(b) by 124 days.

(21) Appl. No.: 17/265,202

(22) PCT Filed: Jul. 30, 2019

(86) PCT No.: PCT/IB2019/056469
§ 371 (c)(1),
(2) Date: Feb. 1, 2021

(87) PCT Pub. No.: WO2020/026128
PCT Pub. Date: Feb. 6, 2020

(65) Prior Publication Data

US 2021/0293216 A1 Sep. 23, 2021

(30) Foreign Application Priority Data

Aug. 2, 2018 (IT) ........................ 102018000007781

(51) Int. Cl.
*F02P 17/12* (2006.01)
*F02P 3/05* (2006.01)
(Continued)

(52) U.S. Cl.
CPC ............... *F02P 17/12* (2013.01); *F02P 3/051* (2013.01); *H01T 13/58* (2013.01); *H01T 13/60* (2013.01); *F02P 2017/121* (2013.01)

(58) Field of Classification Search
CPC .................................. F02P 17/12; F02P 3/051
See application file for complete search history.

(56) References Cited

U.S. PATENT DOCUMENTS 4,886,029 A * 12/1989 Lill ......................... F02P 17/12 324/380
5,046,470 A * 9/1991 Entenmann ............ F02P 17/12 123/481

(Continued)

FOREIGN PATENT DOCUMENTS

EP 0555851 A2 8/1993
EP 0652363 A2 5/1995

(Continued)

OTHER PUBLICATIONS

International Search Report and Written Opinion dated Dec. 6, 2019 from counterpart International Patent Application No. PCT/IB2019/056469.

(Continued)

*Primary Examiner* — Logan M Kraft
*Assistant Examiner* — Joshua Campbell
(74) *Attorney, Agent, or Firm* — SHUTTLEWORTH & INGERSOLL, PLC; Timothy J. Klíma

(57) ABSTRACT

A method of detecting the breakdown voltage between the electrodes of a spark plug connected to an ignition coil for a cylinder ignition system, in an internal combustion engine, includes a detection of an opening of the switch on the primary winding and a detection of a voltage on that primary winding, with the generation of a first signal representative of the voltage trend following the opening of the switch.
(Continued)

Figure 1:
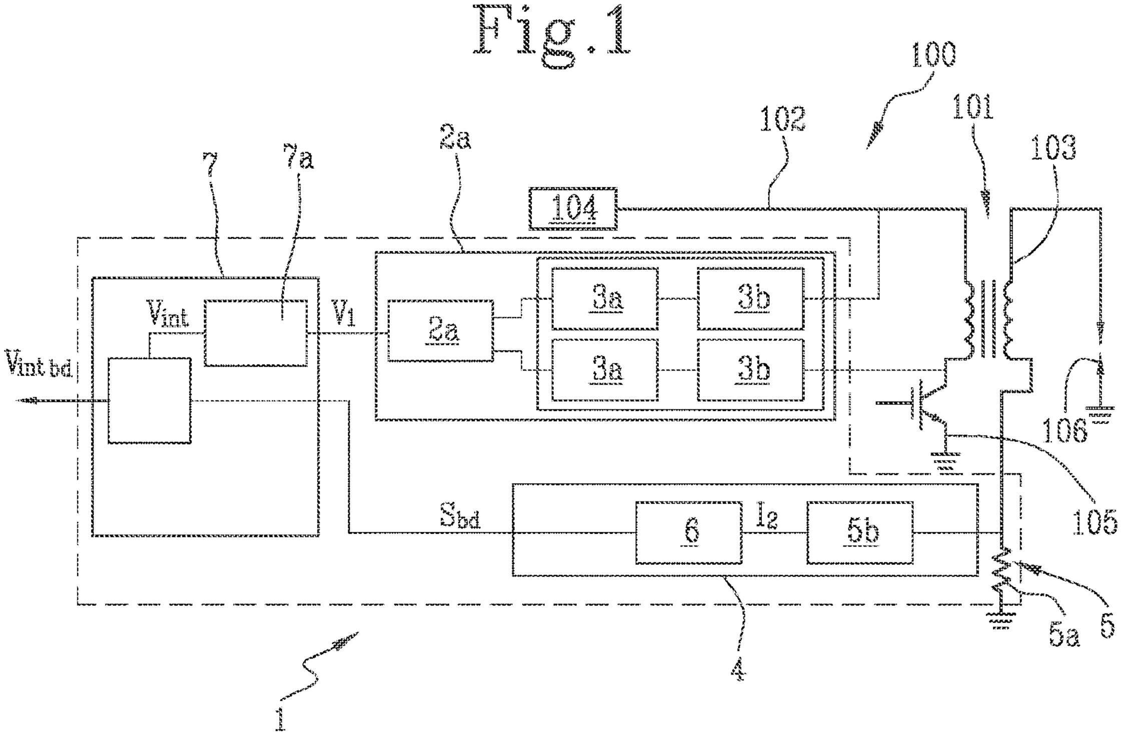

The first signal is then integrated and, following an identification of a breakdown at the ends of the spark plug, a breakdown voltage value is determined as a function of the value of the integrated signal at the time of the breakdown.

8 Claims, 1 Drawing Sheet

(51) Int. Cl.
*H01T 13/58* (2020.01)
*H01T 13/60* (2011.01)

(56) References Cited

U.S. PATENT DOCUMENTS

| | | | | |
|---|---|---|---|---|
| 5,491,416 | A * | 2/1996 | Klimstra | F02P 17/12 324/393 |
| 5,513,620 | A | 5/1996 | Pyko et al. | |
| 6,236,213 | B1 | 5/2001 | Maruta et al. | |
| 9,371,814 | B2 * | 6/2016 | Eisen | F02P 9/007 |
| 2002/0043255 | A1 * | 4/2002 | Kameda | F02P 3/0456 123/644 |
| 2015/0008838 | A1 * | 1/2015 | Reuther | F02P 17/12 315/209 T |
| 2018/0038338 | A1 | 2/2018 | Sugiura et al. | |
| 2018/0202411 | A1 | 7/2018 | Silva et al. | |

FOREIGN PATENT DOCUMENTS

| | | | | |
|---|---|---|---|---|
| EP | 3022436 | B1 * | 3/2021 | F02P 3/0435 |
| JP | H03121273 | A | 5/1991 | |
| JP | 2000038978 | A | 2/2000 | |
| WO | WO-2016063430 | A1 * | 4/2016 | F02D 45/00 |

OTHER PUBLICATIONS

Chinese Search Report dated Feb. 21, 2022 from counterpart Chinese Patent Application No. 2019800645407.

* cited by examiner

METHOD AND DEVICE FOR DETECTING THE BREAKDOWN VOLTAGE BETWEEN THE ELECTRODES OF A SPARK PLUG CONNECTED TO AN IGNITION COIL FOR A CYLINDER IGNITION SYSTEM IN AN INTERNAL COMBUSTION ENGINE

This application is the National Phase of International Application PCT/IB2019/056469 filed Jul. 30, 2019 which designated the U.S.

This application claims priority to Italian Patent Application No. 102018000007781 filed Aug. 2, 2018, which application is incorporated by reference herein.

The present invention concerns a method and a device for detecting the breakdown voltage between the electrodes of a spark plug connected to an ignition coil for a cylinder ignition system in an internal combustion engine.

The present invention is therefore particularly applicable in the automotive sector, and, in particular, in the design and manufacture of high energy ignition systems.

During the ignition of the internal combustion engine cylinders, the breakdown voltage value, i.e. the voltage value at the ends of the spark plug when the dielectric breaks and the spark (or arc) is generated, has always been of particular importance.

The importance of this value is mainly linked to the monitoring of the system, as significant changes of the same can be representative of malfunctions or criticalities that must, in the eventuality, be resolved.

The most immediate solution for detecting this parameter would, clearly, involve directly acquiring the voltage value at the ends of the secondary winding, a procedure that, however, encounters a significant limit in high-energy systems, where the voltage values are so high (up to 50,000 V) as to make direct acquisition complex.

For this reason, the prior art proposes alternative solutions that exploit a much lower voltage detection on the primary winding, in order to reconstruct the secondary winding voltage and, consequently, the breakdown voltage.

This solution, however, although usually practicable and sufficiently accurate, is strongly linked to the quality of the voltage signal on the primary winding, which is generally highly variable and fluctuating. It is, therefore, not very sound, nor is it applicable to all configurations of ignition systems.

For example, in some solutions designed by the Applicant and the subject of the Italian patent IT1429874, the primary winding switch is supported by a storage circuit (or snubber), which allows you to minimise energy dissipation and avoid overheating of the switch.

This circuit, while significantly increasing the efficiency of the system, makes the voltage signal on the primary winding, and especially the switch collector voltage, difficult to read as it is subject to very high amplitude oscillations of limited frequency, which are not compatible with a correct reading of the signal.

In light of this, the purpose of the present invention is to provide a method and a device for detecting the breakdown voltage between the electrodes of a spark plug connected to an ignition coil for a cylinder ignition system in an internal combustion engine capable of overcoming the drawbacks of the prior art mentioned above.

In particular, the purpose of the present invention is to provide a sound and reliable method for detecting the breakdown voltage between the electrodes of a spark plug connected to an ignition coil for a cylinder ignition system in an internal combustion engine, which does not rely on the quality of the voltage signal on the primary winding.

Furthermore, the purpose of the present invention is to provide a device for detecting the breakdown voltage between the electrodes of a spark plug connected to an ignition coil for a cylinder ignition system in an internal combustion engine that is easy to manufacture and can be readily integrated into a coil.

Said purposes are achieved by a detecting method and a detecting device according to the present disclosure.

As mentioned, the method according to the invention is a method for detecting the breakdown voltage between the electrodes of a spark plug connected to an ignition coil for a cylinder ignition system in an internal combustion engine.

The coil comprises a primary winding and a secondary winding.

The primary winding is preferably connected to a voltage generator and is provided with a switch that can be switched between an open condition and a closed condition.

The secondary winding is preferably connected to a spark plug.

The method for detecting involves switching the switch from the closed condition to the open condition (or detecting a switching of the switch from the closed condition to the open condition).

A voltage is preferably detected on the primary winding following said switching.

A first signal representative of said voltage is preferably generated.

The first signal is preferably integrated to generate an integrated signal increasing over time.

A breakdown voltage value is, then, preferably determined according to the value of the integrated signal at the time of the breakdown.

Advantageously, thanks to the integration of the voltage signal, it is possible to transform a strongly vacillating signal into a monotonically increasing signal that is consistent with the time signal, thus facilitating the determination of the breakdown voltage value.

The method thus implemented is therefore highly resistant to disturbances and largely immune to oscillations of the first voltage signal on the primary winding.

The determination of a breakdown voltage value preferably involves identifying an instant representative of a breakdown at the ends of said spark plug and determining a breakdown value of the integrated signal corresponding to the value of the integrated signal at the instant representative of the breakdown.

Note that, at the instant representative of the breakdown, the integration of the first signal could be interrupted or, alternatively, the detection of the voltage of the primary winding could be interrupted.

The identification step of the instant representative of the breakdown preferably comprises the following steps:

- detecting a current on the secondary winding and generating a second signal representative of said current;
- comparing said second signal with a predetermined threshold value;
- identifying the instant representative of the breakdown when said second signal exceeds said predetermined threshold value.

Advantageously, identifying the ignition of the spark is thus simple and direct, with the simple detection of the current on the secondary winding.

In addition, the combination of the integration and the time reference given by the current signal on the secondary winding allows the time when the spark is struck to be precisely determined and, consequently, the time when it is necessary to interrupt the integration.

Preferably, therefore, the method that is the subject of the invention involves the detection module's acquiring the primary voltage, when the switch is opened, and generating the first signal (digital streaming).

When the identification module detects the breakdown and sends the signal representative of the breakdown, the detection module's acquisition or the processing module's integration is interrupted.

The data sample acquired (i.e. digital streaming) is then integrated, preferably following a filtering that eliminates any disturbances, and is then processed to extrapolate the value of the breakdown voltage.

The subject of the present invention is also a device for detecting the breakdown voltage in an ignition coil for a cylinder ignition system in an internal combustion engine.

This device preferably comprises a primary voltage detection module configured to detect a voltage on the primary winding and to generate a first signal representative of said voltage.

There is, preferably, an identification module for a breakdown at said spark plug.

This identification module is preferably configured to generate a signal representative of said breakdown.

Preferably, moreover, there is a processing module linked to said detection module and said identification module and configured to receive the first signal and the signal representative of the breakdown.

The processing module is preferably configured to integrate said first signal over time and to generate an integrated signal increasing over time.

Preferably, moreover, the processing module is configured to determine a breakdown value of said integrated signal upon receipt of said signal representative of the breakdown and to determine a breakdown voltage value as a function of the rupture value of the integrated signal.

Figure 2:
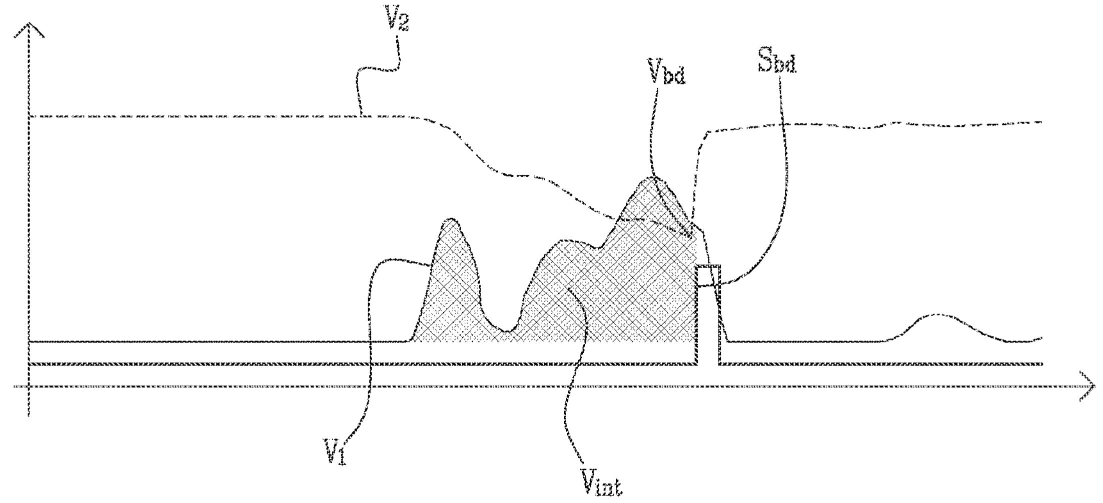

These and other characteristics, together with their relative advantages, will be better identified in the following illustrative, and therefore non-limiting, description of a preferred, and therefore not exclusive, embodiment of a method and a device for detecting the breakdown voltage between the electrodes of a spark plug connected to an ignition coil for a cylinder ignition system in an internal combustion engine as illustrated in the attached drawings, wherein:

FIG. 1 schematically shows an ignition system for a cylinder ignition system in an internal combustion engine provided with a device for detecting according to the present invention;

FIG. 2 shows a diagram displaying the trend of reference magnitudes in the detection of the breakdown voltage.

With reference to the attached figures, the number 1 indicates a device for detecting the breakdown voltage between the electrodes of a spark plug connected to an ignition coil for a cylinder ignition system in an internal combustion engine according to the present invention.

The device 1 is therefore inserted within an ignition system 100 for a cylinder of an internal combustion engine, preferably an inductive one.

The ignition system 100 is therefore a device or set of devices configured to generate a spark inside each cylinder of the endothermic engine by providing the two electrodes of a spark plug 100 with the necessary voltage to break the dielectric allowing the generation of a current flow.

The system 100 is therefore linked to (or comprises) a voltage (or current) generator device 104, preferably to the vehicle battery.

In its preferred embodiment, the generator 104 is therefore configured to supply the system 100 with DC voltage.

More precisely, the generator is a battery, more preferably a car battery, and even more preferably a lead-acid battery.

Alternatively, however, other voltage generators could be used according to the type of engine.

In this respect, the system preferably comprises a coil 101 comprising a primary winding 102 and a secondary winding 103.

The primary winding 102, which is provided with a first and second terminal, is connected, by means of an electrical connection, to the voltage generator device 104.

The secondary winding 103 can be connected (or is connected) to the spark plug 106.

It should be noted that the primary winding 102 comprises a first number of coils $No._I$, while the secondary winding 103 comprises a second number of coils $No._{II}$.

The secondary winding 103 preferably has a higher number of coils than the primary winding 102 in order to increase the voltage on the secondary winding 103 (which, in fact, is part of the high voltage circuit).

In the preferred embodiments, the coils ratio, which is equal to the second number of coils $No._{II}$ divided by the first number of coils $No._I$, is between 80 and 220, preferably about 150.

The system 100 also comprises a switch 105, which is also connected to primary winding 102 and is selectively switchable between an open condition and a closed condition, in order to prevent or to allow, respectively, a current flow through said primary winding 102.

The switch 105 is preferably connected to the second terminal of the primary winding 102.

The switch 105 is preferably of the static kind; more preferably, to allow efficient and reliable management of the loads involved, the switch 105 is an isolated gate bipolar transistor (commonly known as an IGBT).

This switch 105 has, therefore:

- a first node, or collector, connected to the primary winding 102,
- a second grounded node or emitter, and
- a third node, or gate, that can be manipulated to allow the opening or closing of the switch 105 itself.

The device for detecting 1 is therefore linked to said ignition system 100, in particular to the coil 101. The device for detecting 1 comprises a primary voltage detection module 2 configured to detect a voltage on the primary winding 102 and to generate a first signal $V_1$ that is representative of a trend of said voltage (following the opening of the switch).

The detection module 2 is preferably configured to detect the voltage at the switch collector 105.

In its preferred embodiment, the detection module 2 is configured to perform a differential voltage reading at the ends of the primary winding 102.

This differential reading of the primary winding voltage 102 can be performed through an analogue circuit or by a numerical processing of the acquisition afterwards.

Therefore, the detection module 2 preferably has a differential acquisition element 2*a*.

The detection module 2 is preferably configured to store information corresponding to the differential voltage wave shape at the ends of the primary winding 102.

The detection module 2 could also comprise an Analogue-to-Digital converter 2*b*.

The first signal V1 can therefore be either a digital streaming of information or an analogue signal.

Preferably, moreover, the detection module 2 comprises at least one conditioning circuit 3 that has the function of making the differential voltage available at the ends of the primary winding 102.

The conditioning circuit 3 is, preferably, operatively located upstream of the differential acquisition element 2*a*.

Said conditioning circuit 3 is provided with at least one low-pass filter 3*a* to attenuate unwanted disturbances and/or oscillations.

In addition, it is preferable that the conditioning circuit 3 also comprises an attenuation element 3*b* (e.g. a damping network) that allows the voltage to be lowered.

Advantageously, therefore, the detection module provides, at the output, a first signal $V_1$ that is attenuated and properly filtered, easily "readable" and able to be processed.

The device for detecting 1 also comprises an identification module 4 for a breakdown at said spark plug 106.

This identification module 4 is configured to generate, following identification, a signal representative $S_{bd}$ of said breakdown.

The identification module 4 preferably comprises at least one current detection member 5 on the secondary winding 103.

This detection member 5 is preferably configured to generate a second signal $I_2$ that is representative of this secondary current.

The detection member 5 preferably comprises a resistor 5*a*, which is operatively placed between the second winding 103 and a reference (i.e. earth).

In its preferred embodiment, the detection member 5 comprises a high-pass filter 5*b* to make the second signal $I_2$ easier to read.

More precisely, the function of the high-pass filter 5*b* is to focus the analysis of the secondary current on the portion of data around the peak of current generated by the ignition of the spark, avoiding that the synchronisation of the acquisition occurs in conjunction with a disturbance not related to the ignition of the spark.

At least one comparison member 6 is planned, to be located operatively downstream of detection member 5.

The comparison member 6 (or comparator) is configured to compare the second signal $I_2$, i.e. its instantaneous value, with a predetermined threshold value.

When the value of the second signal $I_2$ exceeds said threshold value, the identification module 4 preferably generates the signal representative $S_{db}$ of the breakdown.

More precisely, it is the comparison member 6 that, as a result of the comparison, provides (or not) this signal representative $S_{bd}$ of the breakdown.

The comparison member 6 may comprise a hysteresis that allows the Sbd signal to be sufficiently sound and comprehensible for the processing module 7.

The threshold is preferably greater than 150 mA. More preferably, the threshold is about 200 mA.

According to one aspect of the present invention, the device 1 also comprises a processing module 7 linked to the detection 2 and identification 4 modules.

In this respect, in fact, this processing module 7 is configured to receive the first signal $V_1$ and said signal representative $S_{bd}$ of the breakdown between the electrodes of a spark plug.

The processing module 7 is also configured to (convert and) integrate the first signal $V_1$ over time to generate an integrated signal $V_{int}$ increasing over time.

With the term integrate, we operatively mean the transformation of the first signal $V_1$, which in the time domain can assume instantaneous values fluctuating between a succession of maxima and minima, into an integrated signal $V_{int}$ related to it and representative of the area subtended by the curve defined by the first signal $V_1$ over time.

In other words, the processing module is preferably programmed for calculating the area subtended by the curve of the first signal S1 in a time interval that goes from the opening of the switch 105 to the receipt of said signal representative $S_{bd}$ of the breakdown.

Advantageously, the first signal $V_1$ is thus replaced by a monotonic signal, subject to much softer variations but still increasing over time, which makes it easier to manage and to analyse.

Note that the processing module 7 is, preferably, also configured to filter the first signal $S_1$ in order to reduce the relevance of any external disturbances.

More preferably, the processing module 7 is configured to correlate the first signal $S_1$ detected during the current combustion cycle with corresponding values of the first signal $S_1$ detected in one or more previous combustion cycles.

More precisely, in its preferred embodiment, the first signal $S_1$ is averaged with a plurality of previous first signals $S_1$ in order to filter its wave shape.

The average obtained is then integrated as described above, calculating the area subtended by the curve in the time transient from the opening of the switch 105 to the arrival of the signal representative $S_{bd}$ of the breakdown.

For this purpose, in the event that the signal $V_1$ is a signal corresponding to a digital streaming of information, the processing module 7 comprises an integrating element 7*a* configured to receive the first signal $V_1$ from the detection module 2, designed to calculate the integral of that signal and configured to provide the integrated signal $V_{int}$.

For this purpose, in the event that the signal $V_1$ is an analogue signal, the processing module 7 preferably comprises an Analogue/Digital converter element 7*c* configured to integrate the first signal $V_1$ during conversion.

This Analogue/Digital converter element 7*c* is therefore configured to receive the first signal $V_1$ from the detection module 2 and to provide the integrated signal $V_{int}$.

The Analogue/Digital converter element 7*c* is preferably of the Sigma-Delta type.

For this purpose, in the event that the signal $V_1$ is an analogue signal, the processing module 7 could also comprise an Analogue/Digital converter element 7*b* configured to receive the first signal $V_1$ from the detection module 2 and to provide a signal $V_2$ and an integrator element 7*a* configured to receive and convert the first signal $V_2$ from the conversion module 7*b* and to provide the integrated signal $V_{int}$.

The integrated signal $V_{int}$ is therefore a digital signal.

The processing module 7 is also configured to determine the (instantaneous) value of said integrated signal $V_{int}$ upon receipt of said signal representative $S_{db}$ of the breakdown.

In other words, the processing module 7 is configured to determine a breakdown value $V_{int\text{-}bd}$ corresponding to the value of the integrated signal $V_{int}$ in the instant when it receives the signal representative $S_{db}$ of the breakdown, i.e. in the instant when the secondary current exceeds the threshold value due to the ignition of the spark at the ends of the spark plug 106.

Therefore, when the secondary current exceeds the threshold value, the processing module's integration 7 and/ or the detection of the voltage on the primary winding 102 by the detection module 2 is interrupted.

In addition, the processing module 7 (or another device linked to it) is configured to determine a breakdown voltage value as a function of the rupture value $V_{int-bd}$ of the integrated signal $V_{int}$.

This action is possible thanks to the correlation that exists between the integral of the primary voltage and the breakdown voltage reached.

This correlation is made explicit by an empirically derived relationship or by a mathematical model of the ignition coil.

Empirically derived measurements can be correlated via broken relationships or an interpolation equation.

The subject of the present invention is also a method for detecting the breakdown voltage in an ignition coil for a cylinder ignition system in an internal combustion engine, preferably but not exclusively implemented by means of the device for detecting 1 described up to this point.

In this regard, and without any loss of generality, the terminology and numerical references used up to this point in the description of the device will be maintained, where possible and mutatis mutandis, in the following description of the method that is the subject of the invention.

In the first instance, the method involves detecting (or identifying) a switching of the switch 105 from the closed condition to the open condition.

Subsequently, a voltage on the primary winding 102 is detected, preferably by means of a detection module 2.

The first signal $V_1$ is then generated, which is representative of a voltage trend on the primary winding 102.

The voltage detection on the primary winding 102 preferably involves detecting the voltage at a collector of said switch 105.

More preferably, the voltage detection step on the primary winding 102 involves a differential reading of the voltage at the ends of that winding.

Note that both the detection and the generation of the first signal $V_1$ are performed following the detection of the opening of switch 105.

However, in alternative embodiments, at least the voltage detection on the primary winding 102 could be performed continuously.

Preferably, then, the first signal $V_1$ is filtered so as to eliminate or reduce the effect of external disturbances. This filtration, in accordance with what has been described above, preferably takes place by averaging the first signal $V_1$ with the value and/or the trend of one or more previous signals (i.e. of previous combustion cycles).

The first, preferably filtered, signal $V_1$ is then integrated (over time) in order to generate an integrated signal $V_{int}$ increasing over time.

For the definition of the terms "integrate" and "integration", please refer to what was discussed earlier with reference to the device 1.

At this point, the method involves determining a breakdown voltage value (in the single combustion cycle) as a function of the value of the integrated signal $V_{int}$ when the breakdown occurs (i.e. when the spark is ignited at the ends of the spark plug 106).

In this regard, an identification step of an instant representative of the breakdown at the ends of said spark plug 106 is therefore involved.

This identification step preferably involves detecting a current on the secondary winding 103 and generating (preferably) a second signal $I_2$ representative of said current.

As in the previous case, the detection step can only be performed following the opening of the switch 105 or continuously.

Said second signal $I_2$ is then compared with a predetermined threshold value.

This comparison is performed so as to identify an instant representative of the breakdown when the second signal $I_2$ exceeds the predetermined threshold value.

More precisely, an instantaneous value of the second signal $I_2$ is compared and, when said second signal 12 is greater (or equal) to a predetermined threshold value, the instant representative of the breakdown is identified.

As a result, the signal representative $S_{bd}$ of this breakdown is preferably generated.

At this point, the method preferably involves determining a breakdown value $V_{int-bd}$ of the integrated signal $V_{int}$, corresponding to the value of the integrated signal $V_{int}$ when the second signal exceeds the threshold value $I_2$.

The breakdown value can be determined by interrupting the integration of the first signal $V_1$ upon receipt of the signal representative $S_{bd}$ of the breakdown or by limiting the calculation of the integral to an interval of time that goes from the instant in which the opening of the switch 105 occurs (and is detected) to the instant representative of the breakdown.

Once the breakdown value $V_{int-bd}$ of the integrated signal $V_{int}$ has been determined, the breakdown voltage value $V_{bd}$ is determined as a function of said breakdown value $V_{int-bd}$ of the integrated signal.

The correlation logics between the integrated signal $V_{int}$ and the breakdown voltage $V_{bd}$ have been illustrated earlier and are similarly valid in the context of the method that is the subject of the invention.

The invention achieves its purposes and significant advantages are thus obtained.

In fact, the combined use of an integrated voltage signal and of a monitoring of the secondary current allows for a sound monitoring of the breakdown voltage that, regardless of the nature of the ignition system, can compensate for highly irregular trends in the primary voltage.

The invention claimed is:

1. A method of detecting a breakdown voltage between electrodes of a spark plug connected to an ignition coil for a cylinder ignition system in an internal combustion engine, said coil comprising a primary winding and a secondary winding, wherein:

the primary winding is connected to a voltage generator and is provided with a switch that can be switched between an open condition and a closed condition to initiate a breakdown and spark at the spark plug;

the secondary winding is connected to a spark plug;

said method comprising the steps of:

detecting a switching of said switch from the closed condition to the open condition;

detecting a value of a voltage on the primary winding during a time interval following said switching of the switch;

generating a first signal representative of a development of the value of said voltage during said time interval;

integrating said first signal to generate an integrated signal increasing over time during said time interval;

identifying an instant representative of the breakdown at ends of said spark plug when, during said time interval, a second signal representative of a current on the secondary winding exceeds a predetermined threshold value;

determining a breakdown voltage value according to a value of the integrated signal at the instant representative of said breakdown.

2. The method according to claim 1, wherein the identifying the instant representative of the breakdown comprises the following steps:

detecting the current on the secondary winding during said time interval following said switching of the switch;

generating the second signal representative of a development of a value of said current on the secondary winding during said time interval;

comparing said second signal with said predetermined threshold value.

3. The method according to claim 1, wherein said the detecting the voltage on the primary winding provides for a differential reading of the voltage on the primary winding.

4. A device for detecting a breakdown voltage between electrodes of a spark plug connected to an ignition coil for a cylinder ignition system in an internal combustion engine, said coil comprising a primary winding and a secondary winding, wherein:

the primary winding is connected to a voltage generator and is provided with a switch that can be switched between an open condition and a closed condition to initiate a breakdown and spark at the spark plug;

the secondary winding is connected to the spark plug;

said device comprising:

a primary voltage detection module configured to detect a voltage on the primary winding and generate a first signal representative of said voltage;

an identification module configured to detect an occurrence of the breakdown at said spark plug and to generate a breakdown signal representative of said breakdown, wherein said identification module comprises:

at least one current detection member on the secondary winding configured to generate a second signal representative of a current flowing in the secondary winding;

at least one comparison unit comparing said second signal with a predetermined threshold value, wherein said breakdown signal is generated in a breakdown instant in which said second signal exceeds said threshold value;

a processing module operatively connected with said detection module and said identification module and configured to:

receive an opening signal representative of the switching of the switch from said closed to said open condition;

receive said first signal;

receive said breakdown signal;

integrate over time a value of said first signal in a time interval running after receiving said opening signal to generate an integrated signal increasing over time in said time interval;

determine a breakdown value of said integrated signal upon receiving said breakdown signal;

determine a breakdown voltage value as a function of the breakdown value of the integrated signal at the breakdown instant representative of the breakdown.

5. The device according to claim 4, wherein said detection module comprises a conditioning device including at least one low-pass filter to attenuate unwanted disturbances and/or oscillations.

6. The device according to claim 4, wherein said at least one current detection member includes or is operatively connected to a high-pass filter.

7. The device according to claim 4, wherein said switch is an isolated gate bipolar transistor; said detection module being configured to detect a voltage at a collector of said switch.

8. The device according to claim 4, wherein said detection module is configured to perform a differential reading of the voltage on the primary winding.

* * * * *